United States Patent [19]
Goetz

[11] Patent Number: 5,613,702
[45] Date of Patent: Mar. 25, 1997

[54] APPARATUS FOR INFLATING AN INFLATABLE VEHICLE OCCUPANT RESTRAINT

[75] Inventor: George W. Goetz, Rochester Hills, Mich.

[73] Assignee: TRW Vehicle Safety Systems Inc., Lyndhurst, Ohio

[21] Appl. No.: 606,067

[22] Filed: Feb. 23, 1996

[51] Int. Cl.⁶ .................................................. B60R 21/26
[52] U.S. Cl. ........................ 280/735; 280/741; 280/736
[58] Field of Search .............................. 280/735, 741, 280/736, 728.1, 737; 307/10.1; 340/436, 438; 364/424.05; 422/164, 166; 102/530, 531

[56] References Cited

U.S. PATENT DOCUMENTS

| | | |
|---|---|---|
| 3,756,621 | 9/1973 | Lewis et al. . |
| 3,767,228 | 10/1973 | Lewis . |
| 3,773,352 | 11/1973 | Radke . |
| 3,868,124 | 2/1975 | Johnson ................................ 280/736 |
| 3,922,001 | 11/1975 | Lewis . |
| 3,985,375 | 10/1976 | Lewis et al. . |
| 5,016,914 | 5/1991 | Faigle et al. . |
| 5,122,954 | 6/1992 | Okano . |
| 5,184,846 | 2/1993 | Goetz . |
| 5,320,382 | 6/1994 | Goldstein et al. . |
| 5,411,289 | 5/1995 | Smith et al. . |
| 5,413,378 | 5/1995 | Steffens, Jr. et al. ................. 280/735 |
| 5,430,649 | 7/1995 | Cashler et al. ..................... 364/424.05 |
| 5,445,412 | 8/1995 | Gillis et al. ......................... 280/735 |
| 5,460,405 | 10/1995 | Faigle et al. ......................... 280/735 |

Primary Examiner—Christopher P. Ellis
Attorney, Agent, or Firm—Tarolli, Sundheim, Covell, Tummino & Szabo

[57] ABSTRACT

An apparatus (10) for inflating an inflatable vehicle occupant restraint, such as an air bag (12), includes a collision sensor (24), an inflator (14), and first and second initiators (18,20). The collision sensor (24) senses the occurrence and the severity of a vehicle collision. The inflator (14) contains pressurized inflation fluid and ignitable material (60) heating the inflation fluid. The first initiator (18) initiates a flow of the pressurized inflation fluid from the inflator (14). The second initiator (20) ignites the ignitable material (60). A temperature sensor (26) senses the ambient temperature of the inflator (14). A controller (22) actuates the first initiator (18) at an initial time in response to the occurrence of the vehicle collision. The controller (22) actuates the second initiator (20) after the lapse of a delay time which is determined by the controller (22) with reference to the ambient temperature and the severity of the vehicle collision.

12 Claims, 2 Drawing Sheets

5,613,702

APPARATUS FOR INFLATING AN INFLATABLE VEHICLE OCCUPANT RESTRAINT

FIELD OF THE INVENTION

The present invention relates to an apparatus for inflating an inflatable vehicle occupant restraint such as an air bag.

BACKGROUND OF THE INVENTION

An inflatable vehicle occupant restraint, such as an air bag, is inflated to protect an occupant of a vehicle upon the occurrence of a vehicle collision. The air bag is part of a vehicle occupant restraint system which further includes a collision sensor and an inflator. The collision sensor senses vehicle conditions which indicate the occurrence of a collision. When the collision sensor senses a collision-indicating condition of at least a predetermined threshold level, the inflator is actuated. The inflator then emits inflation fluid which inflates the air bag into the vehicle occupant compartment to help protect an occupant of the vehicle from forcefully striking parts of the vehicle as a result of the collision.

The manner in which the air bag affects movement of the vehicle occupant can be influenced by factors such as the force with which the occupant moves against the air bag and the pressure of the inflation fluid in the air bag. Those factors, in turn, can be influenced by the severity of the collision and the ambient temperature of the inflator.

SUMMARY OF THE INVENTION

In accordance with the present invention, an apparatus for inflating an inflatable vehicle occupant restraint, such as an air bag, comprises collision sensor means and inflator means. The collision sensor means senses the occurrence and the severity of a vehicle collision. The inflator means contains pressurized inflation fluid, and also contains ignitable material for heating the inflation fluid. A first initiator means initiates a flow of the pressurized inflation fluid from the inflator means. A second initiator means ignites the ignitable material.

The apparatus further comprises temperature sensor means and controller means. The temperature sensor means senses the ambient temperature of the inflator means. The controller means responds to the collision sensor means and the temperature sensor means. Specifically, the controller means actuates the first initiator means at an initial time in response to the occurrence of the vehicle collision. The controller means actuates the second initiator means after the lapse of a delay time which is determined by the controller means with reference to the ambient temperature and the severity of the vehicle collision.

In a preferred embodiment of the present invention, the controller means actuates the first initiator means immediately upon receiving the collision signal from the collision sensor. If the ambient temperature of the inflator means is greater than a predetermined minimum temperature, the controller means determines an appropriate delay time for subsequent actuation of the second initiator means. If the ambient temperature of the inflator means is not greater than the predetermined minimum temperature, the delay time has a value of zero, and the controller means actuates the second initiator means simultaneously with the first initiator means.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
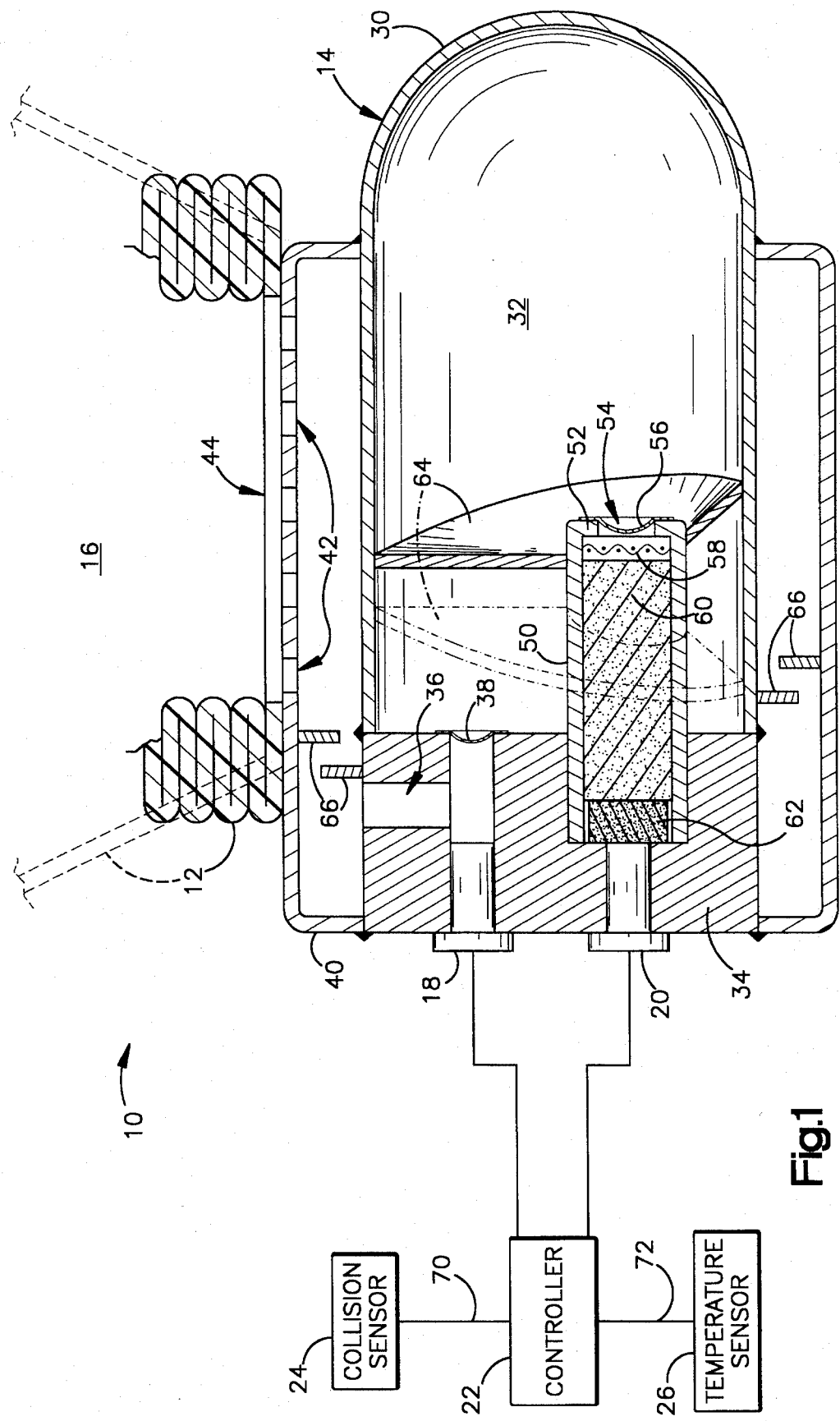
FIG. 1 is a schematic view of a vehicle occupant restraint apparatus comprising a preferred embodiment of the present invention.

A vehicle occupant restraint apparatus 10 comprising a preferred embodiment of the present invention is shown schematically in FIG. 1. The apparatus 10 includes a particular type of inflatable vehicle occupant restraint 12 which is commonly referred to as an air bag. The apparatus 10 further includes an inflator 14 which comprises a source of inflation fluid for inflating the air bag 12. The inflation fluid provided by the inflator 14 flows into the air bag 12 to inflate the air bag 12 from a folded, uninflated condition, as shown partially in solid lines, to an unfolded, inflated condition, as shown partially in dashed lines. When the air bag 12 is inflated, it extends into a vehicle occupant compartment 16 to help protect a vehicle occupant from forcefully striking or being struck by parts of the vehicle as a result of a collision.

The inflator 14 includes first and second initiators 18 and 20 which are actuatable separately from each other. The first initiator 18, when actuated, initiates a first flow of inflation fluid from the inflator 14 to the air bag 12. The second initiator 20, when actuated, initiates a second, augmented flow of inflation fluid from the inflator 14 to the air bag 12. A controller 22 actuates the initiators 18 and 20 in response to signals received from a collision sensor 24 and a temperature sensor 26.

The controller 22 preferably comprises a microprocessor of known construction. As described more fully below, the controller 22 actuates the first initiator 18 in response to the signal received from the collision sensor 24. The controller 22 actuates the second initiator 20 after the lapse of a delay time which is determined with reference to the signals received from both the collision sensor 24 and the temperature sensor 26. The controller 22 thus actuates the first and second initiators 18 and 20 at times that are determined with reference to the vehicle conditions indicated by the signals from the collision sensor 24 and the temperature sensor 26. As a result, the first and second flows of inflation fluid are emitted from the inflator 14 and flow into the air bag 12 at times that are predetermined with reference to those vehicle conditions.

The inflator 14 in the preferred embodiment of the present invention is substantially similar to the inflator disclosed in U.S. Pat. No. 5,016,914, entitled "Vehicle Occupant Restraint System," and assigned to TRW Vehicle Safety Systems Inc. The inflator 14 thus comprises a cylindrical pressure vessel 30 with a storage chamber 32 containing pressurized inflation fluid. The inflation fluid may have any suitable composition and storage pressure known in the art. A closure cap 34 at one end of the pressure vessel 30 has a fluid outlet passage 36 for communicating the storage chamber 32 with the exterior of the pressure vessel 30. A burst disk 38 closes an inner end of the outlet passage 36 to contain the inflation fluid in the storage chamber 32.

The first initiator 18 is an electrically actuatable squib containing pyrotechnic material. When the first initiator 18 is actuated, the pyrotechnic material is ignited and produces combustion products including heat and hot particles, as known in the art. The closure cap 34 supports the first initiator 18 in a position from which it spews those combustion products inward through the outlet passage 36 to the burst disk 38. The combustion products emitted from the first initiator 18 then heat the burst disk 38 to an elevated temperature. This weakens the burst disk 38 sufficiently for the pressure of the inflation fluid in the storage chamber 32 to rupture the burst disk 38. The inflation fluid then flows to the exterior of the pressure vessel 30 through the outlet passage 36 at a flow rate that is determined in part by the flow area of the outlet passage 36, and in part by the fluid pressure in the storage chamber 32. A diffuser structure 40 surrounds the pressure vessel 30, and has a plurality of outlet openings 42 for directing the inflation fluid through an inlet opening 44 in the air bag 12.

The inflator 14 further includes a tubular combustion housing 50 which projects from the closure cap 34 into the storage chamber 32. A circular inner end wall 52 of the combustion housing 50 has an opening 54 which is closed by a corresponding burst disk 56. A particle filter 58 is contained in the combustion housing 50 adjacent to the opening 54. The combustion housing 50 also contains an ignitable gas generating material 60 which, when ignited, rapidly generates a large volume of inflation gas. The gas generating material 60 may have any suitable composition and configuration known in the art. An ignition-enhancing booster material 62 is preferably included in the combustion housing 50 with the gas generating material 60, and also may have any suitable composition and configuration known in the art.

Like the first initiator 18, the second initiator 20 is a squib which emits combustion products, including heat and hot particles, when actuated electrically. The closure cap 34 supports the second initiator 20 in a position from which it spews the combustion products into contact with the gas generating material 60 and/or the booster material 62 in the combustion housing 50. The gas generating material 60 then ignites and rapidly generates a large quantity of inflation gas. When the pressure of the inflation gas in the combustion housing 50 reaches a predetermined elevated level, it ruptures the burst disk 56 and flows into the storage chamber 32 through the opening 54 in the end wall 52.

When the inflation gas generated in the combustion housing 50 flows into the storage chamber 32, it becomes commingled with the stored inflation fluid so as to form an augmented inflation fluid. The inflation gas also heats the stored inflation fluid so as to increase the pressure of the stored inflation fluid. The augmented inflation fluid then flows outward from the storage chamber 32 through the outlet passage 36 at a flow rate that is determined in part by the partial pressure of the inflation gas that has entered the storage chamber 32, and in part by the partial pressure of the stored inflation fluid then remaining in the storage chamber 32. Preferably, the inflation gas emerges from the opening 54 as a gas jet in the manner described in the aforementioned U.S. Pat. No. 5,016,914. The inflator 14 also includes helical deflector blades 64 and baffles 66 for directing the inflation gas and the stored inflation fluid along tortuous flow paths. The blades 64 and the baffles 66 cause inertial separation and plating out of particles from the augmented inflation fluid, as described in the '914 patent.

As known in the art, the collision sensor 24 senses a vehicle condition that indicates the occurrence of a vehicle collision. If the vehicle condition sensed by the collision sensor 24 is above a predetermined threshold level, it indicates the occurrence of a collision having at least a predetermined threshold level of severity. The threshold level of collision severity is a level at which inflation of the air bag 12 is desired for protection of a vehicle occupant. The collision sensor 24 then provides a collision signal which is transmitted to the controller 22 along a line 70, as shown schematically in FIG. 1.

For example, the vehicle condition sensed by the collision sensor 24 may comprise sudden vehicle deceleration that is caused by a collision. The magnitude and duration of the deceleration are measured by the collision sensor 24. If the magnitude and duration of the deceleration exceed predetermined threshold levels, they indicate the occurrence of a collision which exceeds the predetermined threshold level of collision severity. A collision signal is then transmitted to the controller 24 to indicate the occurrence of such a collision. Additionally, the collision signal has a value which indicates the degree to which the magnitude and duration of the deceleration exceed the corresponding threshold levels. The collision signal thus indicates both the occurrence and the severity of a collision for which the air bag 12 is to be inflated.

The temperature sensor 26, which also is a known part, senses the ambient temperature at the inflator 14, and provides a temperature signal which indicates the ambient temperature. The temperature signal is transmitted to the controller 22 along a line 72. Preferably, the temperature sensor 26 provides the temperature signal to the controller 22 continuously while the vehicle is being operated.

The ambient temperature at the inflator 14 affects the pressure of the inflation fluid stored in the storage chamber 32. The ambient temperature thus affects the flow rate at which the inflation fluid exits the storage chamber 32 through the outlet passage 36 upon actuation of the first initiator 18, as described above. The ambient temperature may also affect the rate at which the gas generating material 60 burns in the combustion housing 50. The ambient temperature may thus affect the rate at which the inflation gas is generated in the combustion housing 50, and may consequently affect the time at which the inflation gas reaches the predetermined elevated pressure level at which it ruptures the burst disk 56 and flows into the storage chamber 32 to become commingled with the stored inflation fluid then remaining in the storage chamber 32. In this manner, the ambient temperature may affect the flow rate at which the augmented inflation fluid exits the storage chamber 32 upon actuation of the second initiator 20.

As described briefly above, the controller 22 actuates the first and second initiators 18 and 20 in response to the collision signal received from the collision sensor 24 and the temperature signal received from the temperature sensor 26. The controller 22 preferably actuates the first initiator 18 immediately upon receiving the collision signal from the collision sensor 24. The controller 22 then determines a delay time for actuation of the second initiator 20. The delay time is determined with reference to the collision severity and the ambient temperature indicated by the values of the collision signal and the temperature signal, respectively.

Figure 2:
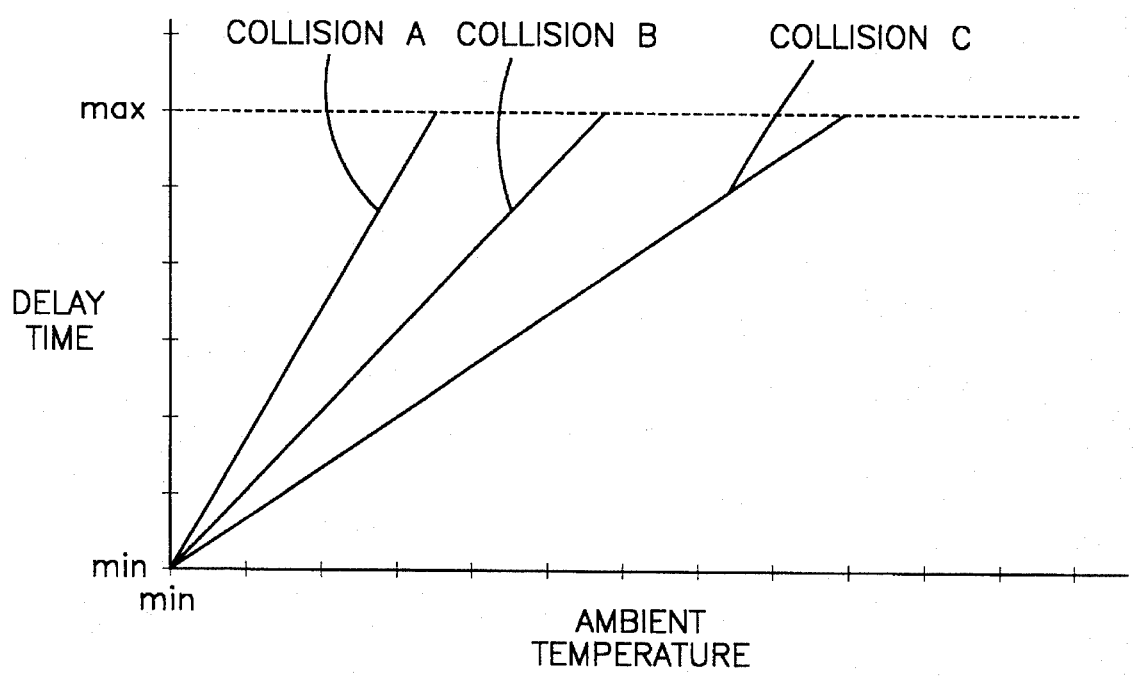
FIG. 2 is a graph showing performance characteristics of the apparatus of FIG. 1.

As indicated by the graph of FIG. 2, the delay time will have a value between predetermined minimum and maximum values. The minimum delay time is used when the ambient temperature is at or below a predetermined minimum temperature. In the preferred embodiment of the present invention, the range of delay times is 0–40 milliseconds, and the minimum temperature is −50° C. The inflator 14 will ordinarily have an ambient temperature that is greater than −50° C. Therefore, the delay time will ordinarily have a value that is greater than zero. However, the controller 22 in the preferred embodiment actuates the second initiator 20 with a delay of 0 milliseconds, i.e., simultaneously with actuation of the first initiator 18, if the ambient temperature is not greater than −50° C. The low minimum temperature of −50° C. enables the controller 22 to select a delay time throughout a correspondingly wide range of ambient temperatures. Any other suitable minimum delay time and/or minimum temperature can be used in accordance with the present invention.

In FIG. 2, the three lines labeled Collision A, Collision B, and Collision C respectively correspond to first, second, and third vehicle collisions of successively greater severity. Accordingly, for a given level of collision severity, the delay time increases with increased ambient temperature. For a given ambient temperature, the delay time decreases with increased collision severity. The controller 22 may determine the delay time by selecting from a look-up table based on empirically derived values of ambient temperature, collision severity, and corresponding delay times. The controller 22 may alternatively determine the delay time as the result of a computation based on a predetermined functional relationship between ambient temperature and collision severity. In any case, the delay time between actuation of the first and second initiators 18 and 20 causes the stored inflation fluid and the augmented inflation fluid to flow into the air bag 12 at times and at pressures that are determined with reference to the collision severity and the ambient temperature. The air bag 12 is thus inflated in a manner that has a predetermined relationship to those vehicle conditions.

From the above description of the invention, those skilled in the art will perceive improvements, changes and modifications. For example, the apparatus could include other sensors such as an occupant presence sensor, an occupant out-of-position sensor, and a seat belt buckle switch sensor, as known in the art. Such improvements, changes and modifications within the skill of the art are intended to be covered by the appended claims.

Having described the invention, the following is claimed:

1. Apparatus comprising:
    collision sensor means for sensing the occurrence and the severity of a vehicle collision;
    inflator means for providing inflation fluid, said inflator means containing pressurized inflation fluid and ignitable material for heating said pressurized inflating fluid;
    first initiator means for initiating a flow of said pressurized inflation fluid from said inflator means;
    second initiator means for igniting said ignitable material;
    temperature sensor means for sensing the ambient temperature of said inflator means; and
    controller means for responding to said collision sensor means and said temperature sensor means by actuating said first initiator means at an initial time in response to said occurrence of said vehicle collision, and by actuating said second initiator means after the lapse of a delay time which is determined by said controller means with reference to said ambient temperature and said severity of said vehicle collision.

2. Apparatus as defined in claim 1 wherein said delay time has a value within a range including a value of zero.

3. Apparatus as defined in claim 2 wherein said delay time has a value greater than zero such that said controller means actuates said second initiator means at a subsequent time following said initial time if said ambient temperature is greater than a predetermined minimum temperature, said delay time having a value of zero such that said controller means actuates said second initiator means simultaneously with said first initiator means at said initial time if said ambient temperature is not greater than said predetermined minimum temperature.

4. Apparatus as defined in claim 3 wherein said predetermined minimum temperature is −50° C.

5. Apparatus as defined in claim 3 wherein said subsequent time is not later than 40 milliseconds after said initial time.

6. Apparatus as defined in claim 1 wherein said ignitable material comprises gas generating material which, when ignited, generates inflation gas, said inflator means including a pressure vessel having a storage chamber containing said pressurized inflation fluid, said inflator means directing said inflation gas into said storage chamber to commingle said inflation gas with said pressurized inflation fluid in said storage chamber.

7. Apparatus comprising:
    collision sensor means for sensing a vehicle condition indicating the occurrence of a vehicle collision, said collision sensor means providing a collision signal indicating said vehicle condition;
    inflator means for providing inflation fluid, said inflator means containing pressurized inflation fluid and ignitable material for heating said pressurized inflation fluid;
    first initiator means for initiating a flow of said pressurized inflation fluid from said inflator means;
    second initiator means for igniting said ignitable material;
    temperature sensor means for providing a temperature signal indicating the ambient temperature of said inflator means; and
    controller means for actuating said first initiator means upon receiving said collision signal, said controller means actuating said second initiator means after the lapse of a delay time which is determined by said controller means with reference to said vehicle condition and said ambient temperature.

8. Apparatus as defined in claim 7 wherein said delay time has a value within a range including a value of zero.

9. Apparatus as defined in claim 8 wherein said delay time has a value greater than zero if said ambient temperature is greater than a predetermined minimum temperature, said delay time having a value of zero if said ambient temperature is not greater than said predetermined minimum temperature.

10. Apparatus as defined in claim 9 wherein said predetermined minimum temperature is −50° C.

11. Apparatus as defined in claim 9 wherein said range is 0–40 milliseconds.

12. Apparatus as defined in claim 7 wherein said ignitable material comprises gas generating material which, when ignited, generates inflation gas, said inflator means including a pressure vessel having a storage chamber containing said pressurized inflation fluid, said inflator means directing said inflation gas into said storage chamber to commingle said inflation gas with said pressurized inflation fluid in said storage chamber.

* * * * *